United States Patent
Kanagaraj

(10) Patent No.: US 11,050,552 B2
(45) Date of Patent: Jun. 29, 2021

(54) SYSTEM AND METHOD FOR HASHING A DATA STRING USING AN IMAGE

(71) Applicant: Infosys Limited, Bangalore (IN)

(72) Inventor: Stephenson Daniel Kanagaraj, Chennai (IN)

(73) Assignee: INFOSYS LIMITED, Bangalore (IN)

( * ) Notice: Subject to any disclaimer, the term of this patent is extended or adjusted under 35 U.S.C. 154(b) by 42 days.

(21) Appl. No.: 15/721,110

(22) Filed: Sep. 29, 2017

(65) Prior Publication Data

US 2018/0323966 A1    Nov. 8, 2018

(30) Foreign Application Priority Data

May 3, 2017   (IN) .............................. 201741015660

(51) Int. Cl.
*H04L 29/06*   (2006.01)
*H04L 9/06*    (2006.01)
*G06F 21/60*   (2013.01)
*G06F 21/64*   (2013.01)

(52) U.S. Cl.
CPC .......... *H04L 9/0643* (2013.01); *G06F 21/602* (2013.01); *G06F 21/64* (2013.01)

(58) Field of Classification Search
CPC ....... H04L 9/0643; G06F 21/602; G06F 21/64
See application file for complete search history.

(56) References Cited

U.S. PATENT DOCUMENTS

| | | | |
|---|---|---|---|
| 5,875,264 A | 2/1999 | Carlstrom | |
| 7,251,343 B2 | 7/2007 | Dorrell et al. | |
| 7,421,128 B2 | 9/2008 | Venkatesan et al. | |
| 9,635,011 B1* | 4/2017 | Wu | H04L 63/0807 |
| 2003/0152222 A1* | 8/2003 | Nakano | G06F 21/10 380/201 |
| 2007/0157262 A1* | 7/2007 | Ramaswamy | H04H 20/14 725/87 |
| 2010/0074443 A1* | 3/2010 | Ishii | G09C 5/00 380/243 |
| 2011/0299785 A1* | 12/2011 | Albu | G06F 3/1454 382/209 |

(Continued)

OTHER PUBLICATIONS

Chedda et al., "A Hash-Based Image Encryption Algorithm", Journal, 2009, 1 page, Elsevier B.V., Retrieved from the Internet: <http://www.sciencedirect.com/science/article/pii/S0030401809010980>.

(Continued)

*Primary Examiner* — Khoi V Le
*Assistant Examiner* — Michael M Lee
(74) *Attorney, Agent, or Firm* — Troutman Pepper Hamilton Sanders LLP (Rochester)

(57) ABSTRACT

Hashing data using an image by performing a bit by bit concatenation of input text and hash key. The result is concatenated bit by bit with the salt. A two bit by two bit multiplication between the result and the reverse of the result is performed to get a next output. The bits of this output are used as coordinates to extract pixel and RGB values from an image. The extracted values are merged to form a string. The string is truncated to a desired length, and then split into two equal strings. A bit by bit concatenation is performed on the split strings to get a hash output.

12 Claims, 4 Drawing Sheets

(56) References Cited

U.S. PATENT DOCUMENTS

| | | | | |
|---|---|---|---|---|
| 2013/0039584 | A1* | 2/2013 | Harmanci | G06K 9/38 |
| | | | | 382/197 |
| 2013/0198582 | A1* | 8/2013 | Stauffer | H03M 13/2906 |
| | | | | 714/755 |
| 2013/0290734 | A1* | 10/2013 | Branton | H04L 9/0863 |
| | | | | 713/189 |
| 2015/0039902 | A1* | 2/2015 | Arya | G06F 7/74 |
| | | | | 713/189 |
| 2015/0324590 | A1 | 11/2015 | Krten et al. | |
| 2016/0093069 | A1 | 3/2016 | Maiyuran et al. | |
| 2018/0019977 | A1* | 1/2018 | Bhat | H04L 63/0428 |
| 2018/0225323 | A1* | 8/2018 | Jayaram | G06F 21/6218 |

OTHER PUBLICATIONS

Venkatesan et al., "Robust Image Hashing", 2000, 2 pages, IEEE, Retrieved from the Internet: <http://ieeexplore.ieee.org/document/899541/?arnumber=899541&abstractAccess=no&userType=inst>.

Seyedzade et al., "A Novel Image Encryption Algorithm Bsed on Hash Function", 2010, 3 pages, IEEE, Retrieved from the Internet: <http://ieeexplore.ieee.org/document/5941167/?arnumber=5941167&abstractAccess=no&userType=inst>.

Sharma et al., "A Novel Technique for Secure Information Transmission in Videos Using Salt Cryptography ", 2013, 10 pages, vol. 3, No. 10, IISTE, Retrieved from the Internet: <http://www.iiste.org/Journals/index.php/IKM/article/viewFile/7994/8327>.

Borkar et al., "Improved Hash Based Approach for Secure Color Image Steganography using Canny Edge Detection Method", Journal, Jun. 2016, pp. 793-975, vol. 5, Issue 6, IJARCCE, Retrieved from the Internet: <http://www.ijarcce.com/upload/2016/june-16/IJARCCE%20177.pdf>.

* cited by examiner

SYSTEM AND METHOD FOR HASHING A DATA STRING USING AN IMAGE

This application claims the benefit of Indian Patent Application Serial No. 2017/41015660 filed May 3, 2017, which is hereby incorporated by reference in its entirety.

FIELD

This technology generally relates to a hashing a data string. More particularly, it relates to methods, systems and non-transitory media that facilitate hashing a data string using an image.

BACKGROUND

Hashing is a function that converts a data string into a numeric string output of fixed length that represents the original string. Hashing is used in many encryption algorithms. Hashing is always a one-way operation. There is no need to "reverse engineer" the hash function by analyzing the hashed values. In fact, the ideal hash function cannot be derived by such analysis. A good hash function should have a zero collision which means not produce the same hash value from two different inputs.

A hash function uses the hash table to compute an index into an array of buckets or slots, from which the desired value can be found. It is an abstraction of an array that allows any value to be used as an index. While an array requires that indices be integers, a hash table can use a floating-point value, a string, another array, or even a structure as the index. This index is called the key, and the contents of the array element at that index are called the value. A hash table is a data structure that stores key/value pairs and can be quickly searched by the key. Because insertion and removal are operations dependent on the speed of the search, they tend to be fast as well.

In a recent trend, a hashing function uses input text with a key and salt. It has many limitations including that it can be cracked due to the increasing power of hardware and software advancement. Additionally, the output bits are limited. Therefore, a process is required to provide a higher number of bits as output even with a minimum of 64 bit key and 64 bit salt.

SUMMARY

A method for hashing a data string using an image comprises converting each of an input string, a hash key of a predefined length, and a salt of a predefined length associated with the input string into numerical data strings. A first hash function is applied on the converted numerical data strings to get a first output string. A set of values for a set of parameters is extracted from a predetermined image using numerals from the first output string as coordinates. A second hash function is applied on the extracted set of values to get a second output string. The second output is truncated to a predetermined number of bits. The truncated second output string is split into multiple data strings. A third hash function is applied on the split data strings to get a hash value output.

A data string hashing device, using an image which comprises at least one processor; and at least one memory unit operatively coupled to at least one processor communicatively coupled over the cluster computing network and having instructions. The instructions enable the processor to convert each of an input string, a hash key of a predefined length, and a salt of a predefined length associated with the input string into numerical data strings. A first hash function is applied on the converted numerical data strings to get a first output string. A set of values is extracted from a predetermined image, using numerals from the first output string as coordinates. A second hash function is applied on the extracted set of values to get a second output string. The second output is truncated to a predetermined number of bits. The truncated second output string is split into multiple data strings. A third hash function is applied on the split data strings to get a hash value output.

One or more machine-readable media comprising machine-executable instructions causing a machine to perform a method for hashing a data string using an image, the method comprising converting each of an input string, a hash key of a predefined length, and a salt of a predefined length associated with the input string into numerical data strings. A first hash function is applied on the converted numerical data strings to get a first output string. A set of values is extracted from a predetermined image using numerals from the first output string as coordinates. A second hash function is applied on the extracted set of values to get a second output string. The second output is truncated to a predetermined number of bits. The truncated second output is split string into multiple data strings. A third hash function is applied on the split data strings to get a hash value output.

BRIEF DESCRIPTION OF THE DRAWINGS

The embodiments of the present invention are illustrated by way of example and not as limitation in the figures of the accompanying drawings, in which like references indicate similar elements and in which.

DETAILED DESCRIPTION

Figure 1:
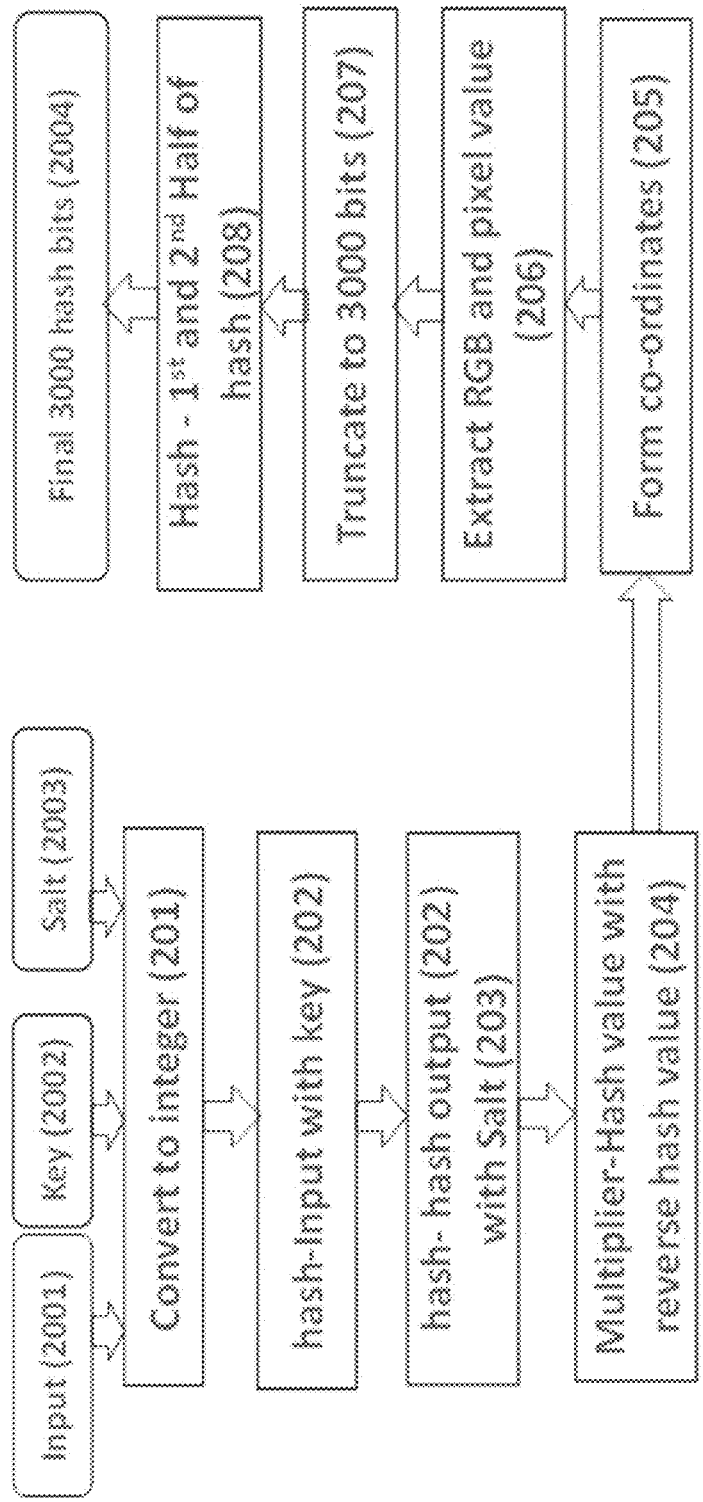
FIG. 1 represents an embodiment of the process as described herein.

Hashing a data string using an image gives an advantage of a higher number of bits as output even with a minimum of 64 bit key and 64 bit salt. The hash is difficult to crack, as there is no use of hash table. Instead pixel values and RGB values are used to perform hash table lookup to provide a strong hash function.

This hashing helps keep the sensitive data hashed instead of storing the plain text in the database. In one embodiment this hashing is used in the login functionality and sign up functionality to store the user name and password combinations as a hash. The hashed password will be saved in the database so that the password cannot be viewed as a plain text even if any person gains access to database. In one embodiment, the present hashing is performed at the server side.

In an embodiment, a hash function is performed on a data string received at a client device, using a hash key and salt associated with the data string. The bits of the result data string are used as coordinates in an image. The corresponding pixel and RGB values of the coordinates are used to make a new hash.

A further hash function is implemented on the new hash to get a final hash value of desired bit strength.

This hash function using an image provides a higher number of bits as output, even with the smaller length hash and salt. In one embodiment, the hash function provides a 3000 bit output with a 64 bit salt, and 64 bit key.

In an embodiment, while creating a user login in any application, the username and password is created at the client device. The username and password combination is transmitted to the server device. The username may be transmitted without any transformation. The password is transmitted to the server device in encrypted form.

In one embodiment, the server device where the hash function is implemented generates a hash key, and an image to be used in the hash function. When the username and the decrypted password is received at the server device, a salt is generated which is associated with the corresponding username. The combined value of user name and password is hashed using the salt, hash key, and the image as described in detail in the following paragraphs. The hashed password is stored in the data base along with the username and the salt associated with the username.

When a user tries to login to the application by entering the username and password, the username and decrypted password is transmitted to the server device. The server device provides the image and salt associated with the username from database. Hash function is performed on the decrypted password using the hash key, image and the salt. The output is compared with the hashed password stored in the data base. The user is accordingly authenticated.

In one embodiment, the hash is performed at the client device after the hash key, salt and image is transmitted by the server device.

The present disclosure will now be explained in more detail using the accompanying figures. The figures are merely for the purpose of illustration and are not limiting in any way.

FIG. 1 is an embodiment of a process as disclosed.

The input for the hash function is a data string (2001). The string can be of alphanumeric, or alphabetic or any other data form. The string can be of any length as received. The string can be received at a client device as input. The string can also be transmitted as a part of any other industrial data processing, where hashing is used for data security.

Hash key (2002) is a constant key which is used for performing a hash function. Each hash function has a predetermined hash key, which is used for every input where the particular hash function is applied. The hash key can be alphanumeric, numeric or alphabetic or any other form. The length of the hash key can depend on the hash function. The length of the hash key can also depend on the requirement of the application where it is used. The hash key can be generated by a server device. In one embodiment the server device generates the hash key as a one-time activity when the hash function is initially installed.

Salt (2003) is a random data that is used as an additional input to a hash. Salt varies for every input data that has to be hashed. In one embodiment, a new salt can be randomly generated for each input by the client device. In one embodiment, the server device has a component which is configured to generate a salt in a required format. The salt remains the same every time this input is provided by the client device. Using a salt in a hashing provides more security, as it becomes more complex for a brute-force attack to decode a password. The salt can be alphanumeric, numeric or alphabetic or any other form. The length of the salt can be random. The length can also depend on the application where the hash function is to be applied.

In an embodiment, the input (2001), the hash key (2002) and the salt (2003) are converted into integer or numeric form (201). The conversion can be done using ASCII code. The conversion can also be done using any other form of data conversion e.g. decimal or hexadecimal and then ASCII or decimal. Another form of data conversion can also be used to convert the input, hash key and salt into numeric form. In another embodiment, the input (2001), the hash key (2002) and the salt (2003) are transmitted to the server and then converted into numeric form. The server device has converter components which are configured to perform the conversion into numeric form. In another embodiment, the conversion is done at the client device and then the values are transmitted to the server device.

In an embodiment, the server device performs a first hash function on the numeric forms of the input (2001), the hash key (2002) and the salt (2003). The first hash function initially performs a bit by bit concatenation of the numeric form of input and the hash key (202) to get a first concatenated string. The first bit from the input is selected, and the first bit from the hash key is selected and they are concatenated to form the first two bits of the first concatenated string. The next bit is then selected from the input and from the hash key and concatenated to form the next two bits of the first concatenated string. Similarly the concatenation is repeated till all bits of the input are used. In one embodiment, if the input is larger than the hash key, then the bits of the hash key are repeated from beginning till all bits of the input are concatenated as a cycle. In another embodiment, more than one bit from the input or from the hash key can be used at a time for concatenation. In one embodiment, concatenation is done by using the char arrays. The input and the hash key form two separate char arrays, where each character from the two char arrays will be mixed to form a mixed char array. Later these concatenated char from the mixed char array will be formed as a string.

The first concatenated string is then concatenated with the numeric form of the salt (203) to generate a hash string, as a part of the first hash function. The first bit from the first concatenated string is selected, and the first bit from the salt is selected, and they are concatenated to form the first two bits of the hash string. The next bits are then selected from the first concatenated string and the salt and concatenated to form the next bits of the hash string. Similarly concatenation is repeated till all bits of the first concatenated string are used. In one embodiment, if the first concatenated string is larger than the salt, then the bits of salt are repeated from beginning till all bits of the first concatenated string are concatenated as a cycle. In another embodiment, more than one bit can be used at a time for concatenation.

The first hash function finally performs a two bit by two bit multiplication between the hash string generated above, and the reverse of the hash string (204). The first two and last two bits of the hash string are multiplied to form the bits of the first output string. Then the next two bits are multiplied with the next two bits from the reverse hash. Similarly all the bits of the hash string are multiplied with the bits of the reverse hash string to get the first output string. The last two bits of the hash string and the last two bits of the reverse hash are not multiplied since these bits were already multiplied as first step of this multiplication step. In an embodiment, there can be a different number of bits selected for the multiplication.

In an embodiment, the hashing uses an image and the first output string to identify some values (205). The server device generates an image along with the generation of the hash key. The image is constant for the hash function, and is used for every input to be hashed. In an embodiment, the server device has components configured for creation of image. The image can be stored in a database in the server or can be in the application server memory itself. The image used for hashing can be grayscale or colored image. The type of image to be used can be decided during the implementation, and accordingly a configuration can be done.

In an embodiment, first four bits are selected from the first output string. The selected four bits are then split into two bits for x coordinate and two bits for y coordinate. The x, y coordinate is the traced in the image. In an embodiment the x and y coordinate can be more than two bits each based on the resolution of an image. In an embodiment the pixel value and the RGB value for the x, y coordinate is extracted (206). Pixel value corresponds to light intensity value of the coordinate. In another embodiment, some other set of parameters can be extracted from the image e.g. alpha value, Color value etc. In a different embodiment, there can be still more number of parameter that can be extracted.

Once the pixel value and RGB value is extracted for x, y coordinates, the next four bits are identified from the first output string and split into x and y coordinates. The pixel value and RGB are extracted. Similarly all bits of the first output string are used as x, y coordinates. All the extracted values are merged to form a second output string.

The second output string is then truncated to a desired length (207). In one embodiment, the present hashing provides a 3000 bit hash. The second output string is truncated to 3000 bits, using a left truncation or right truncation. The truncation function can also be performed by any known string truncation operation. In one embodiment, truncation is done by using char arrays where the characters between specific limits will be considered and others were discarded. Later these truncated bits are converted to a string. As an example, the present hashing provides a 3000 bit hash, hence characters between 0 to 3000 bits are considered and other characters were discarded in the char array.

The truncated string is split into a set of strings. In one embodiment, the truncated output is split into two equal strings 1 to 1500 bits, and 1501 to 3000 bits. A third hash function is performed on the split strings. The first bit from the two split strings are selected, and concatenated (208) i.e. bit 1 and bit 1501. Similarly the next two bits are selected and concatenated, till all the bits are concatenated to give a hash output (2004).

The generated hash is the final output. In the embodiment, the final output length is 3000 bit.

The hashing as described above will now be elaborated with the help of an example. The example is only for the purpose of illustration and is not limiting in any way. The strings used here are sample data, and are used only for the purpose of explaining the present disclosure.

Following are an example of input, key and salt. The key and salt are at the server device. The input is encrypted in client side and transmitted to the server side.

| INPUT | Stephensondaniel |
|---|---|
| KEY | Hzv1t4n6w72gvxfi4nolw2ukipws1xi71wl2v6hyu2s5 usxgav3fcf4yqqjaszgk |
| SALT | Ayzpluqnqcytwyluh4lscj2sbph2vsxifi1gdzszn2nipkcy dxa7i5r5pu1ujgtp |

The input is decrypted at the server. In this example the strings are converted into numeric form using ASCII conversion.

| INPUT NUMERIC | 115116101112104101110115111110100971101051011108 |
|---|---|
| KEY NUMERIC | 10412211849116521105411955501031181201210552110 11110811950117107105112119115491201055549119108 50118541041211175011553117115120103971185110299 1025212111311310697115122103107 |
| SALT NUMERIC | 971211221121081171131101139912111611912110811710 45210811599106501159811210450118115120105102105 4910310012211512211050110105112107991211001209755 1055311453112117491171061031161 12 |

The first hash function is applied on input and key. A bit by bit concatenation is applied on numeric form of input and key. In the present example, the key is larger number of bits than the input. Hence the bits of input are repeated till all bits of key are covered to generate a first concatenated string.

| Key with Input = first concatenated string | 11014511212611108141911211605421101101514011119551 51 51011100311010891721011001201501505121101801115111 1 06811011915102111074110071110150111125111191111150 41 90102907110150515045911011911008815105111186514011 01 41122110141170510111105151351111711111501120001907 31 91701110855110110120989111052151261120111111321110 34 11006191711011511521211101311001 70 |
|---|---|

Later in this example, bit by bit concatenation is performed on first concatenated string and salt to generate a hash string.

| first concatenated string with salt = hash string | 19170112415112122111226110181101871141139111102111 13 69095142211111106111109115211410018111117915054155 211 50180111151909013016150011018599187121120110140500 11 21081151051152005110251110021180051419111053111010 11 02628111150112129111501500211110110075411120100771 9 19110211510010111210295715151110951513111114550341 11 92011107249901711711001651005311510641519219170112 11 91121201018281105811015711111311816051114309191102 11 41111621211910211411018710157110014151211005811511 5 39591110161570111115191851011211200405001191087131 15 91127001101511008251501514091110031120009182921111 15 01522211511025601112001101511111211302719191102314 1 10100102601997157511005151351111455231121121111071 4 3911110701107601 |
|---|---|

Two bit by two bit multiplication is performed between the hash string and reverse of hash string of this example to generate a first output string.

| First Output String | 19129210122875611324682947724267112037812123478515 44 51663118316550210121975103587396925204211110604513 41 18121988209110701981321211871365500543005721213000 45 01056116541846814501761650902910198019821321013291 40 21025009020881655105770624076531017758891022040020 28 02091321027031981901501212243401215176150117084681 36 55615508700231132150154082523371185218031572093812 13 82311071011045113220319108313564512151057001215143 14 31211543135345163892081902724118812646118713202729 69 02703451306306451270309692720132187646112118824794 28 19206384513313515412114314312155700510121645135108 33 19201324511100107123138121382093157018852112337825 01 54150132231087055056113654687081115017612154340221 21 15019019827031013220928020400022910881775310765062 47 70551016588090202502101409132210213198198009190201 65 17645014684181655611045030001215723005450013651871 21 13219801107209988121183414516011011422520969873103 59 75121210501651183663451154478523121378120671242772 94 4681325612871210129 2 |
|---|---|

The first output string is used to make x, y coordinates. First four coordinates of the first output string are 1912. So x, y coordinates would be (19,12). Then the next four bits are taken and so on.

Figure 4:
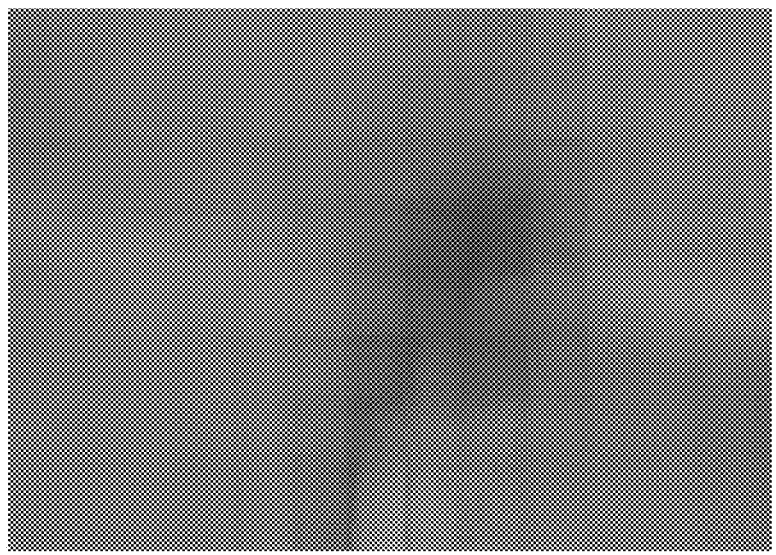
FIG. 4 is a diagram of an example of an image.

The image used in this example is shown in FIG. 4.

Pixel and RGB value is extracted from the image using the coordinates formed from the first output string. Let us assume the following values were extracted from the image.

| (x, y) | (19, 12) |
|---|---|
| Pixel value | 1343743 |

-continued

| RGB value | 2351271 |
|---|---|
| Merged value | 13437432351271 |

As a next step in the example, all extracted values from the above image are merged to generate second output string.

| Second output string | 1343743235127123040255166021375922239881285623236989193945122610456179
8424614601559527232522518191162286220174105322911131889755227423712157
4023711541562587232403724714132187411148964823369168826872421361195069
8226602242240024914201874941227100312815312361145260810421652241499598
2333050115173623810981939964226102414758382331232115097423811222272755
2218213134374123512731894093227255116334792311957274300921437312284760
2213540618496246144022870482212656260886621649303520002501610221695252
1581421120249147014804442331054253976321763131084671239115115718325315
4115846225314921757919229453322169525215812508525515831695188230344468
4543245142122847602213540215394422334401806587228111522719932218575547
5224713706207982461352287488251157012165102371122102731624083122862082
5116208832025416704894702481362618496246144021557292232747169467623036
4418078672281065101811024011921479931233107512165102371122180658722811
1526132142163234117574823815608171482431364222719252154120054982251026
4190722491550214423922372172457325516031808127228105126703242156512553
9842471400141976423486121559022531592219392252167074982324414312144241
2237215220619622286121151736238109820198162254624234187022068189487342
4113422480349218393522719892218511173875122912015527032471451267798221
5353412823012361113289534251149294796424113741435338234255421391262239
2102080238224661835660725014312862082511620219392252167021442392237217
3560952501451101503824013122339314220781428013912136517290814251144213
7057223522521741051229111524166012193239488191248141135481425015022895
3425114922380825516301414138234108622159152224821261321421632341747446
2298610194916622666182538995217661328080322133932117574923815591882856
2276924227199322185721539442233440289534251149211484132381223108338823
9120448639824814821411324234119415610542324634687615245130127353442146
7169113325415632405620219751222036392229692145005223691915411225316601
5423992321191247141321874112735344214671622049192229191411324234119419
3945122610452874882511570128230123611133548162501500215547522328451875
9602279681568453232175927422412144031202440322528451081599239127121521
5522341372920952511391916442541544227199322185795027224112802201625517
0013537182358810227071222190816872792306517155977823251302735344214671
6247549821858222079214224701848486424815401149435238118512771812361313
9139225415501620716231692035430325015219479642411374195043522661291877
4942279010187545022798622784255167015564532326427221695252158110854352
3911251217278237109210221992401039167475123011411363424235503215718325
3154129209525113911608192231118016084462311172950272241128014804422331
0562534225515722304025516608829412421353241404621942342411751219512528
8512251153036044325012851027316240831290109254160325400142176218223741
2521503173926222911825521912471471253899521766131479680233108091392254
1550222976252153018065872281115152320253173026121872163637137285423513
7422297625215302006523225985266955121568179010925416031545472232107021
4424122372152808034213393061823924614512608104216522489599254162115413
7423212322242552521481159228253146418820962277216289534251149211527642
3810542890232511511173875122912012354925516432678750215323410196422401
1361629906231334617579192294533188056422778122287048221265615413742321
23218303372281863 |
|---|---|

The second output string of this example is truncated to 3000.

| Truncated Hash value | 1343743235127123040255166021375922239881285623236989193945122610456179
8424614601559527232522518191162286220174105322911131889755227423712157
4023711541562587232403724714132187411148964823369168826872421361195069
8226602242240024914201874941227100312815312361145260810421652241499598
2333050115173623810981939964226102414758382331232115097423811222272755
2218213134374123512731894093227255116334792311957274300921437312284760
2213540618496246144022870482212656260886621649303520002501610221695252
1581421120249147014804442331054253976321763131084671239115115718325315
4115846225314921757919229453322169525215812508525515831695188230344468
4543245142122847602213540215394422334401806587228111522719932218575547
5224713706207982461352287488251157012165102371122102731624083122862082
5116208832025416704894702481362618496246144021557292232747169467623036
4418078672281065101811024011921479931233107512165102371122180658722811
1526132142163234117574823815608171482431364222719252154120054982251026
4190722491550214423922372172457325516031808127228105126703242156512553 |
|---|---|

```
9842471400141976423486121559022531592219392252167074982324414312144241
2237215220619622286121151736238109820198162254624234187022068189487342
4113422480349218393522719892218511173875122912015527032471451267798221
5353412823012361113289534251149294796424113741435338234255421391262239
2102080238224661835660725014312862082511620219392252167021442392237217
3560952501451101503824013122339314220781428013912136517290814251144213
7057223522521741051229111524166012193239488191248141135481425015022895
3425114922380825516301414138234108622159152224821261321421632341747446
2298610194916622666182538995217661328080322133932117574923815591882856
2276924227199322185721539442233440289534251149211484132381223108338823
9120448639824814821411324234119415610542324634687615245130127353442146
7169113325415632405620219751222036392229692145005223691915411225316601
5423992321191247141321874112735344214671622049192229191411324234119419
3945122610452874882511570128230123611133548162501500215547522328451875
9602279681568453232175927422412144031202440322528451081599239127121521
5522341372920952511391916442541544227199322185795027224112802201625517
0013537182358810227071222190816872792306517155977832513027353442146711
6247549821858222079214224701848486424815401149435238118512771812361313
9139225415501620716231692035430325015219479642411374195043522661291877
4942279010187545022798622784255167015564532326427221695252158110854352
3911251217278237109210221992401039167475123011411363424235503215718325
3154129209525113911608192231118016084462311172950272241128014804422331
0562534225515722304025516608829412421353241404621942342411751219512528
8512251153036044325012851027316240831290109254160325400142176218223741
2521503173926222911825521912471471253899521766131479680233108091392254
1550222976252153018065872281115152320253173026121872163637137285423513
7422297625215302006523225985266955121568179010925416031545472232107021
4424122372152808034213393061823924614512608104216522489599925
```

The exemplary truncated string is split into two and a bit by bit concatenation is performed to get final hash value of length 3000 bits.

```
Hash value   6103142317943322339541828711921320448012451511365640821143275509125
             2022329889851324825561213429326293889018923595415613202164110441536
             8127394814028466212416509115552925224782231225621235211841291161362
             2324816724270414764212095836212091191419311168682927656562128724523 3
             8791925125177460621337218105840135262215383792332214107357724497213
             4811352519817848121815468292674689223432629711698983226281782547221
             1356319149452026393842420626809252344222541010429429111442804118372
             4398411222237110080333182882135931122034641816439286204881104482211
             6451212341244293945191892431353601500514125312743663243688170691 85
             1294359193604122276315032444124174568731862931311323322514115506937
             2442035861210222129277521725252202316832912321239463972411425305015
             2272331689914901953421217222555311166630314574922339191293527121794
             1320407912411433271381724218142776305232414325144066711864292602449
             6119424202292189710441812322142263546121690481896369241561429236013
             0542502080724580812651101252710619258225320115283164121111323052448
             9116427500114580004241452534371502524322583495716837251976603212371
             9068841657618243593121352111755791287342252341152411414508341622022
             5434104392221572587495119028219549593233292112679152215522115585122
             2530481532752591250893512659151138981293106344442456481455444322247
             5119492312222188457769052022173252440121125830924240212632354541071
             0800163558377212882131518582120721297903721221282517950584176582722
             4779123370066521077195852947671832532225817340828723551314547201142
             6176156120427357419182221180528723212602749028134122224876021088428
             5418166422048881352400215144196473054283984171082541821737612861128
             3469163214369114349022215545175259021263220774176126391466972602335
             0433604342158001758261792427891604625411011387141109254004131592221
             6467192993118273734190472521729106150110827357415102222178908665282
             7728248215151156276011352516442513623322364412177252714689253285125
             1650881170184584234532133961412252172119722572812534711200902514 0
             9282212959120420614013990176272447951152530021114441213396232432742
             2137525405372312557511863023513810584112279222089150255112163790131
             2640281159625213215151389081462048741446020311411197726945203247826
             2142111525890012428503414529223231190359622255324142627505714597822 2
             3320444012453511261640482842192421327422115325230264119460242622816
             9142213145214713167253182110995812205129888156122225541612543203346
             1084740322250061821885914082773341264214103843212249800130499225148
             1369033522524701091849222127168251181212733784715215222195102301175 3
             5922760232224971114852152562717991822427115437513245132889293502112
             7366611131134278996583042235311048902991437992624524411515307242 12
             4937563235822135432051584026153897122268212131952115022302800225338
             1272340626611823158676201762356031741331722886524028325511317642202
             2219973692252251251360720020164542233292252938752216763955650192512
             5560811475910110019520534812640031135142524373292331241202700728114
```

-continued

```
4422840112329317221135625810782093048211432359131046412812337902547
621243551222650281170441201561522229418191559294215 6
```

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

Figure 2:
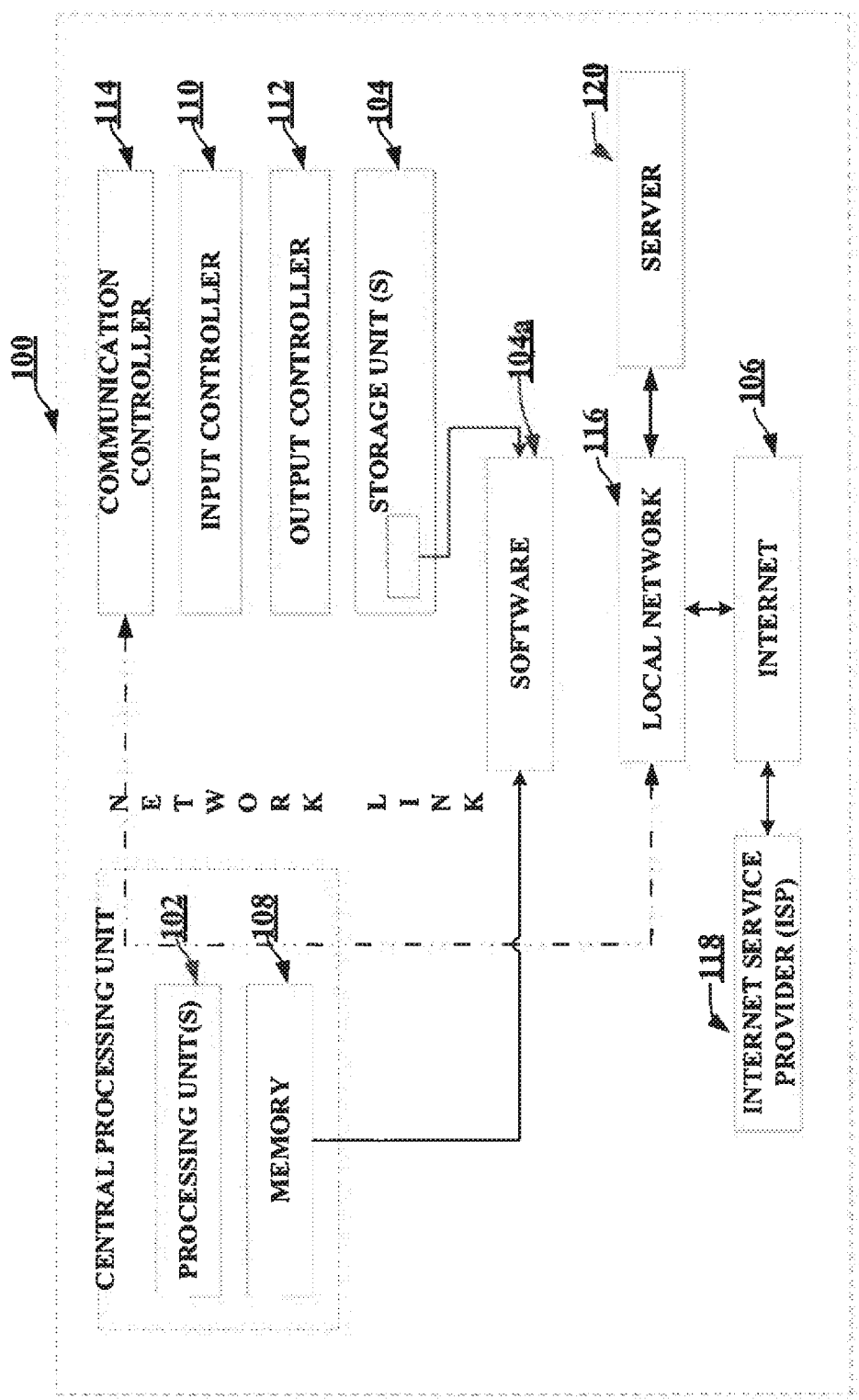
FIG. 2 represents an exemplary embodiment of a computing environment for implementing the process as described herein.

FIG. 2 is a diagrammatic representation of a hashing system capable of processing a set of instructions to perform any one or more of the methodologies herein, according to an example embodiment. FIG. 2 shows a diagrammatic representation of machine in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114.

The instructions may further be transmitted and/or received over a network via the server 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

The instructions enable the computing system to perform the process, and the related embodiments as explained above. In one embodiment the computing system resembles a server device which performs the hashing. The memory (104) stores the hash of required texts. The processor (102) has instructions which perform hashing on the input text. The hashing is performed as described in detail above, and including all related embodiments. The processor (102) also has instructions to compare the hash and confirm the authenticity of the input text.

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-Ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors. Accordingly, the specification and drawings are to be regarded in an illustrative rather than a restrictive sense.

Figure 3:
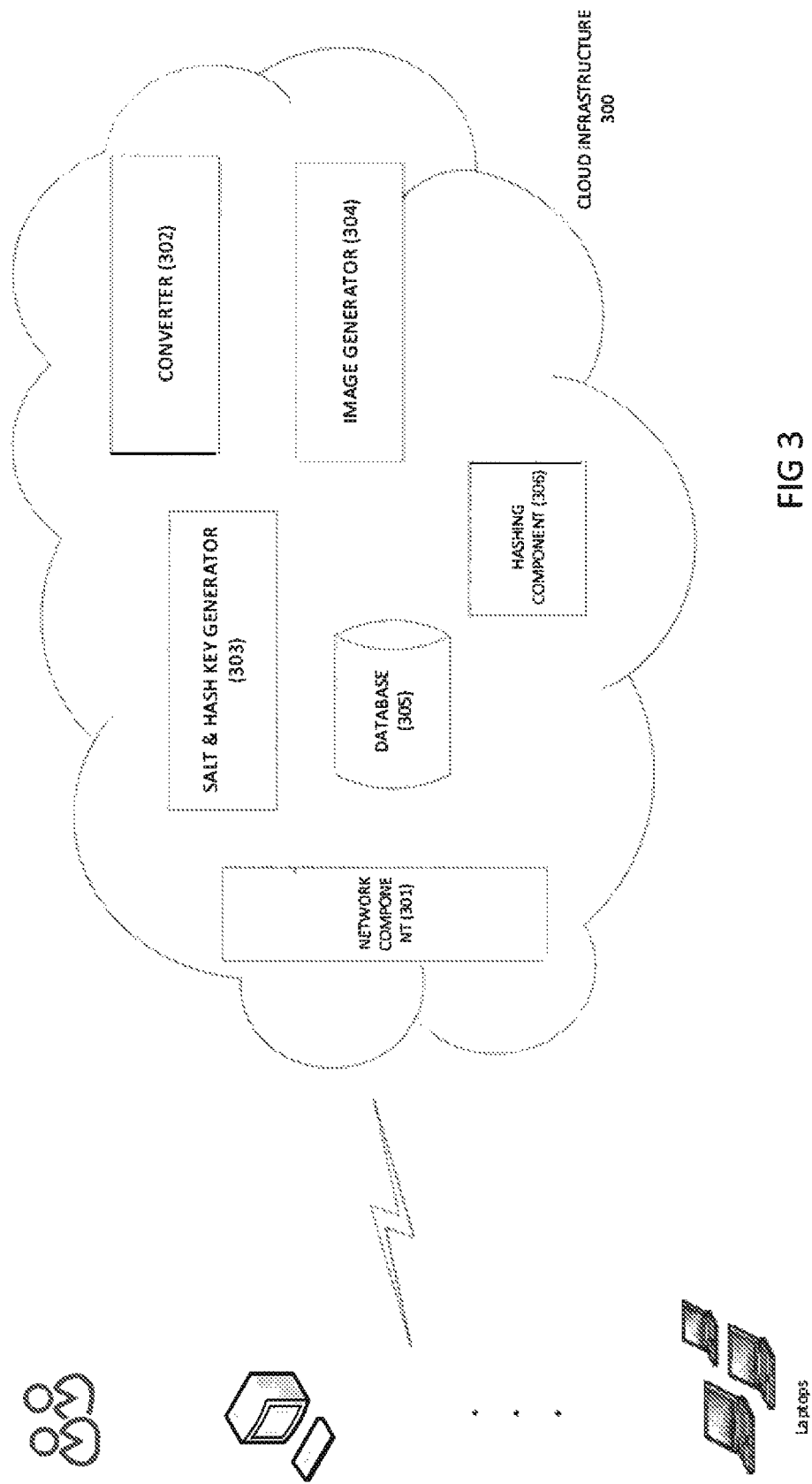
FIG. 3. represents an exemplary embodiment of a cloud infrastructure for implementing the process as described.

FIG. 3 represents another exemplary embodiment for implementing the present process. As described above the client devices (3010) transmit the user credentials to the server. The client devices can be any user handheld communication device, or any other network enabled electronic device which can be used for logging in. In this embodiment, the server device is implemented on a cloud infrastructure (300). The cloud infrastructure has a network component (301), which provides an interface to connect to one or more client devices (3010). The client devices are connected to the cloud infrastructure (300) via any defined network topology and network protocol like TCP/IP, and any wireless technology.

In an embodiment, the cloud infrastructure (300) comprises an image generator (304), which generates image to be used for the hash function. The image generation can be using a binary pattern. Any other image generation technology can also be used.

In an embodiment, the cloud infrastructure (300) comprises a salt & hash key generator (303). Random key generators are well known in technology. Depending on the requirements, an appropriate key is generated. The length of the hash key and salt can be user defined.

In an embodiment, the generated image, and hash key can be stored in a database (305) on the cloud infrastructure (300). The hashed password and username salt can also be stored in the database (305). The hash function can fetch the required data as required during the hashing process.

In an embodiment, the cloud infrastructure (300) has a converter component (302) which converts the password, salt and hash key into ASCII or any other required number format.

In an embodiment, the cloud infrastructure (300) has a Hashing component (306) which has instructions stored, which configures component to perform the hash function as described in detail in the earlier paragraphs.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for hashing a data string using an image, the method comprising:

converting each of an input string, a hash key of a predefined length, and a salt of a predefined length associated with the input string into numerical data strings;

applying a first hash function on the converted numerical data strings, to get a first output string, wherein the first hash function comprises:

concatenating of the input string and the hash key to obtain a first concatenated string;

concatenating of the first concatenated string with the salt to obtain a hash string; and generating of a reverse string from the hash string to get the first output string and wherein with the concatenation of the input string and the hash key a smaller one of the input string and the hash key is repeated until all of a larger one of the input string and the hash key is used to obtain the first concatenated string;

extracting a set of values from an image using numerals from the first output string as coordinates to utilize with a second hash function;

applying the second hash function on the extracted set of values from the image to get a second output string;

truncating the second output string to a predetermined number of bits; and splitting the truncated second output string into multiple data strings, and applying a third hash function on the split data strings to get a hash value output in order to provide a higher number of bits as output with minimum bits of salt.

2. The method of claim 1, wherein the applying the first hash function comprises:

performing a bit by bit concatenation of the converted numerical data strings associated with the input string and the hash key to generate the first concatenated string;

performing a bit by bit concatenation of the generated first concatenated string and the converted numerical data string associated with the salt to generate the hash string;

generating a reverse of the hash string; and performing a two bit by two bit multiplication of the hash string and the reverse of the hash string to get the first output string.

3. The method of claim 1, wherein the extracting a set of values from an image comprises:

selecting two bits from the first output string, for x coordinate;

selecting next two bits from the first output string, for y coordinate;

extracting the set of values from the x and y coordinate of the image; and repeating the selecting two bits, the selecting next two bits, and the extracting for subsequent bits from the first output string.

4. The method of claim 3, wherein the applying a second hash function comprises concatenating the extracted set of values to generate the second output string.

5. The method of claim 3, wherein the set of values comprise s an RGB value and a pixel value.

6. The method of claim 1, wherein the applying a third hash function comprises performing a bit by bit concatenation of the multiple data strings to get the hash value output.

7. A data string hashing device comprising:

at least one processor; and at least one memory unit operatively coupled to the at least one processor and having instructions stored thereon that, when executed by the at least one processor, cause the at least one processor to:

convert each of an input string, a hash key of a predefined length, and a salt of a predefined length associated with the input string into numerical data strings using a converter component;

apply a first hash function on the converted numerical data strings to get a first output string using a hashing component, wherein the first hash function comprises:

concatenating of the input string and the hash key to obtain a first concatenated string;

concatenating of the first concatenated string with the salt to obtain a hash string; and generating of a reverse string from the hash string to get the first output string and wherein with the concatenation of the input string and the hash key a smaller one of the input string and the hash key is repeated until all of a larger one of the input string and the hash key is used to obtain the first concatenated string;

extract a set of values from an image using numerals from the first output string as coordinates using the hashing component to utilize with a second hash function;

apply the second hash function on the extracted set of values from the image to get a second output string using the hashing component;

truncate the second output string to a predetermined number of bits using the hashing component; and split the truncated second output string into multiple data strings and apply a third hash function on the split data strings to get a hash value output using the hashing component in order to provide a higher number of bits as output with minimum bits of salt.

8. The device of claim 7, wherein the applying a first hash function comprises:

perform a bit by bit concatenation of the converted numerical data strings associated with the input string and the hash key to generate the first concatenated string using the hashing component;

perform a bit by bit concatenation of the generated first concatenated string and the converted numerical data string associated with the salt to generate the hash string using the hashing component;

generate a reverse of the hash string using the hashing component; and perform a two bit by two bit multiplication of the hash string and the reverse of the hash string to get the first output string using the hashing component.

9. The device of claim 7, wherein the extracting a set of values from an image comprises:

select two bits from the first output string for x coordinate using the hashing component;

select next two bits from the first output string for y coordinate using the hashing component;

extract the set of values from the x and y coordinate of the image using the hashing component; and repeat the select two bits, the select the next two bits and the extract the set of values for subsequent bits from the first output string.

10. The device of claim 9, wherein the applying a second hash function comprises concatenating the extracted set of values to generate the second output string using the hashing component.

11. The device of claim 9, wherein the set of values comprises an RGB value and a pixel value.

12. The device of claim 7, wherein the apply a third hash function comprises performing a bit by bit concatenation of the multiple data strings to get the hash value output using the hashing component.

* * * * *